Figure 1:
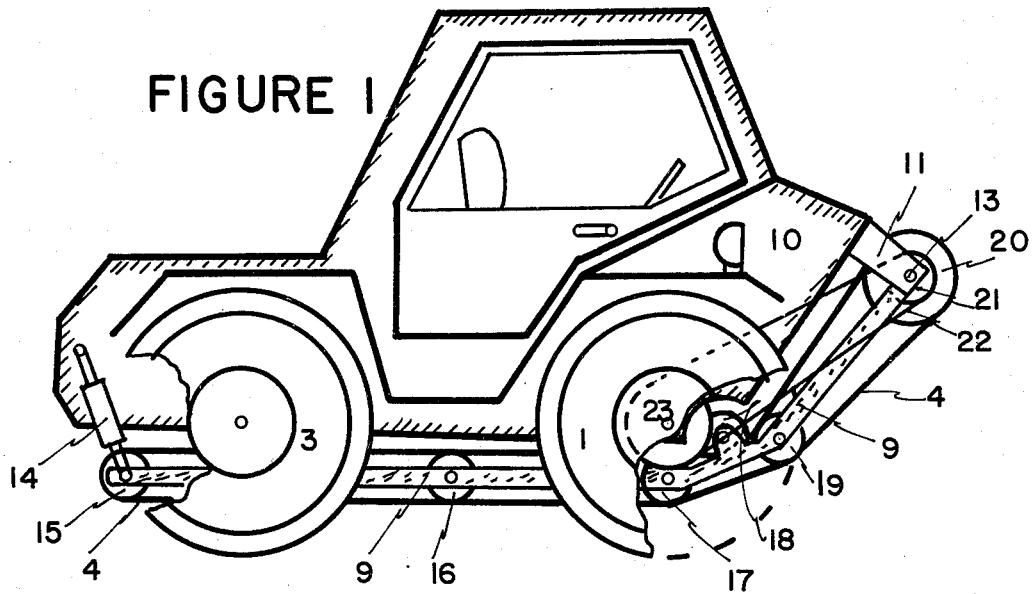

United States Patent [19]
Kehler

[11] 3,937,288
[45] Feb. 10, 1976

[54] ALL TERRAIN VEHICLE

[75] Inventor: Paul Kehler, South Bend, Ind.

[73] Assignee: Applied Inventions Corporation, North Tonawanda, N.Y.

[22] Filed: Mar. 6, 1974

[21] Appl. No.: 448,533

[52] U.S. Cl. .................................. 180/9.3; 180/6.7
[51] Int. Cl.² .................................. B62D 21/14
[58] Field of Search .......... 180/9.3, 6.7, 9.2 R, 9.34, 180/9.36, 9.38, 9.44, 5 R; 305/23, 32

[56] References Cited
UNITED STATES PATENTS

| | | | |
|---|---|---|---|
| 1,509,030 | 9/1924 | Roy | 180/9.3 X |
| 2,856,014 | 10/1958 | Garnier | 180/9.3 |
| 3,456,750 | 7/1969 | Kehler | 180/6.7 |

*Primary Examiner*—Philip Goodman

[57] ABSTRACT

A power driven vehicle having a set of wheels mounted along each of its sides and having endless tracks suspended between the two sets of wheels in an arrangement that substantially covers the whole underside of the vehicle and thereby renders the vehicle bellyless; said endless tracks being individually powered and engaging with the ground whenever the wheels mounted along the sides of the vehicle sink into the ground to a predetermined depth.

2 Claims, 3 Drawing Figures

ALL TERRAIN VEHICLE

This invention deals with an all terrain vehicle that solves the dilemma involved in optimizing a vehicle for equally good performance on improved, hard surfaces such as roads, as well as on unimproved, soft surfaces such as snow and mud. In addition, the described all terrain vehicle improves the obstacle climbing capability of currently used all terrain vehicles, which are easily immobilized by ground contours or by stones or logs on which the belly of conventional vehicles can come to rest, thereby relieving its wheels or tracks of the ground pressure and traction necessary for its locomotion.

Wheels are commonly used as the running gear of vehicles designed to operate on improved, hard surfaces. Unfortunately, the small load bearing area of wheels makes them undesirable for off-road vehicles intended for travel over soft ground such as snow or mud. Conventional off-road vehicles employ endless tracks or large, low-pressure tires that are mounted along its sides. The increased load bearing areas obtainable by the running gear of these vehicles, however, is compensated by loss of mobility (speed and maneuverability) of the vehicles on improved, hard surfaces.

A group of vehicles even more specialized for soft terrain, the so-called bellyless vehicles, also sacrifice mobility on improved, hard surfaces for their capability to travel over snow and mud (see U.S. Pat. Nos. 1,749,276; 3,371,733; 3,456,750, U.S. Pat. application Ser. No. 420,285 and the copending application for a Coaxial Set of Differential Gear Trains).

More recently, some vehicles have been disclosed to the public in which all-terrain mobility is achieved by modification of the vehicles' running gear. The U.S. Pat. Nos. 3,710,886; 3,724,580 and 3,737,001, for example, show how originally wheeled vehicles can be converted to tracked vehicles for use on soft terrain. The U.S. Pat. No. 3,774,706, on the other hand, shows how an originally tracked vehicle can be converted to a wheeled vehicle for use on hard terrain.

The present invention, conceived earlier and disclosed to the Patent Office on Mar. 6, 1972 in FIG. 5 of Disclosure Document No. 009431, involves a novel vehicle that has a true all-terrain mobility (i.e., mobility over hard as well as over soft terrain) that is superior to that of any other ground vehicle known. The invented vehicle moves over hard and improved surfaces with the speed of common wheeled vehicles. Its ground pressure is lower, and its mobility on soft terrain therefore higher, than that of conventional tracked vehicles. Its obstacle climbing ability (over large stones, logs, ground contours, etc.) is superior to that of vehicles having exposed bellies and having the tendency to run up on obstacles and get stuck on them.

The main object of the invention, therefore, is to show how, on an all terrain vehicle, wheels and tracks can be combined into a running gear system which has all-terrain capabilities that are superior to those of any other running gear system.

Another object of the invention is to show how all elements of the vehicle's running gear, i.e., wheels as well as tracks, can be powered for better mobility and maneuverability.

Figure 2:
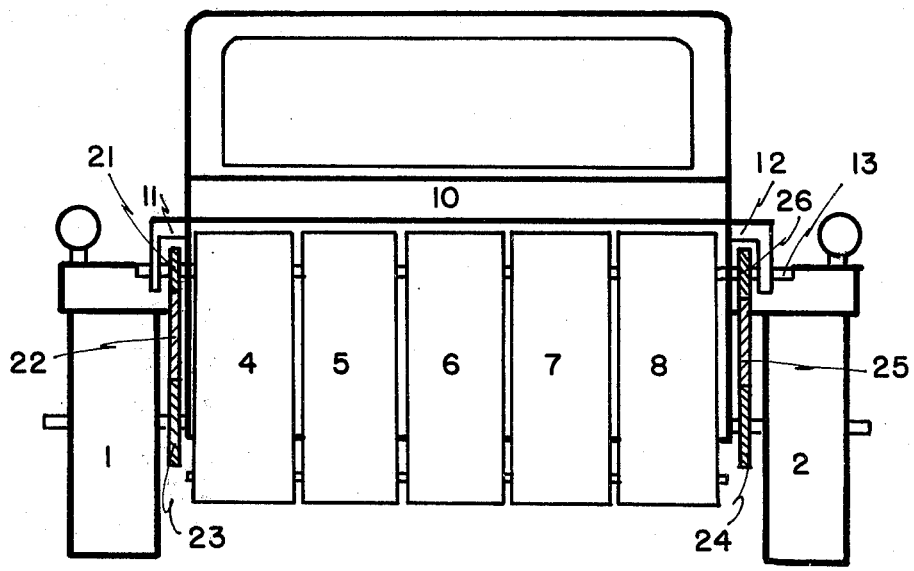
Figure 3:
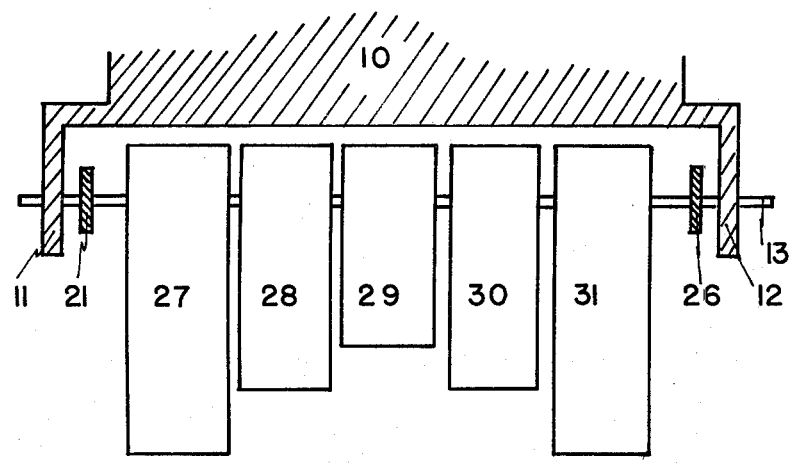

The novel features which I believe to be characteristic of this invention are set forth in the appended claims. The principles of the invention, however, are best understood from the following description of specific embodiments of the invention, read in connection with the accompanying drawings, in which:

FIG. 1 shows the side elevation of one specific embodiment of the all terrain vehicle, FIG. 2 shows the front elevation of the all terrain vehicle shown in FIG. 1, and FIG. 3 shows the geometric arrangement of the tracks of another specific embodiment of the all terrain vehicle.

Reference will now be made by using numerals which designate corresponding parts shown in the FIGS. 1, 2 and 3:

The all terrain vehicle described in this specification has two wheels mounted along each of its sides. On the right side of the vehicle are mounted the wheels 1 and 3. Wheel 2 is one of the two wheels mounted on the left side of the vehicle. The particular number of wheels shown in FIG. 1 has been chosen for simplicity only. More than two wheels can be mounted on each side of the vehicle without violation of the principles disclosed in this specification. The only requirement is that the wheels on each side of the vehicle are operably connected into sets in a manner that allows only simultaneous rotation of all wheels within a set, and only rotation resulting in the same ground speed for all wheels within a set. The connecting means, not an object of this invention, can be a chain, a shaft and gear system, or a hydraulic or electric coupling, as long as it causes the wheels within a set to rotate at the same ground speed.

Between the two sets of wheels is mounted a multiplicity of endless tracks, shown as the tracks 4, 5, 6, 7 and 8 in the FIGS. 1 and 2. These tracks are held in position by gears and idler wheels mounted on a frame 9 which, in turn, is attached to the front end of the main body 10 through the brackets 11 and 12 and the shaft 13. The rear end of the frame 9 is held in position relative to the main body 10 by two shock absorbers/springs, one of which, the shock absorber/spring 14, is shown in FIG. 1.

Each of the tracks 4, 5, 6, 7 and 8 is powered by a differential gear system, which is connected to the adjacent tracks, or to the adjacent track and the adjacent set of wheels in such a manner, that each of the tracks is driven at a ground speed that is intermediate the ground speeds of its two adjacent tracks or intermediate the ground speeds of its adjacent track and its adjacent set of wheels.

The number of tracks shown in FIG. 2 has been arbitrarily chosen for illustration purposes. Any other number of tracks can also be mounted between the two sets of wheels without violation of the principles disclosed in this specification.

Maneuvering of the illustrated all terrain vehicle is accomplished by skid steering:

For straight forward or backward motion, power is applied to the two sets of wheels at the same rate, which makes the wheels in both sets rotate at the same ground speed and in the same direction. For slow turns of the vehicle, power is applied to the two sets of wheels at different rates, which makes the wheels in each of the two sets of wheels rotate in the same direction but at different ground speeds. For on-the-spot turns of the vehicle, the two sets of wheels are powered to move at the same ground speed but in opposite directions. In all the maneuvers described above, the tracks of the vehicle are powered at a speed that is intermediate the ground speeds of its two adjacent tracks or intermediate the ground speeds of its adjacent track and its adjacent set of wheels.

Many means are available to accomplish proper skid steering of the all terrain vehicle. Only the method of skid steering, however, but not the details of the skid steering mechanism, is an object of the present invention. The details of possible skid steering mechanisms are listed at this place only to demonstrate the versatility of the described all terrain vehicle.

In purely mechanical skid steering systems, power from the power plant is applied directly to the drive means powering the two sets of wheels. The tracks are powered by driven means which are powered by differential drive means. The differential drive means can be differentials operably connected to the tracks (similar to the differentials described in U.S. Pat. No. 3,371,733), they can be sets of differentials mounted separately from the inner tracks (similar to the differentials described in U.S. Pat. No. 3,456,750), or they can be mounted coaxially as shown in the FIGS. 1, 2 and 3. The details of the coaxial set of differentials used for the powering of the tracks of the All Terrain Vehicle were disclosed to the Patent Office in Disclosure Document 009431. A patent application for this set of differentials is submitted simultaneously with the present application.

Hydraulic or electric drive systems can also be utilized for the powering and skid steering of the All Terrain Vehicle. The operating principle of such systems is illustrated in the copending patent application for a Wheeled Bellyless Vehicle.

Since skid steering is used for the maneuvering of the All Terrain Vehicle described in this application, it is desirable that the vehicle has as small a length to width ratio as possible. The vehicle shown in the FIGS. 1 and 2, therefore, is more wide than long, i.e., the distance between the wheels 1 and 3 is shorter than the distance between the weels 1 and 2. It was mentioned above that the frame 9, holding the tracks 4, 5, 6, 7 and 8, is attached to the main body 10 through the brackets 11 and 12, the shock absorber/spring 14 and another shock absorber/spring not shown in the Figures. Idler wheels 15, 16, 17, 18 and 19 are used to shape the tracks 4, 5, 6, 7 and 8 into contours conforming with the underside and the front of the main body 10. The idler wheels 15, 16, 17 and 19 are within the loop formed by the track 4, and the idler wheel 18 is outside of it. This particular mounting of the idler wheels assures that the tracks 4, 5, 6, 7 and 8 and the frame 9 form a rather rigid, strong, and independent subsystem of the All Terrain Vehicle. This subsystem, also including the set of differentials and the driven means mounted on the shaft 13, will be referred to as "track assembly" throughout this specification.

The driven means mounted on the shaft 13 are engaged to and power the tracks 4, 5, 6, 7 and 8. Only the driven means 20, powering the track 4, is shown in FIG. 1. This driven means 20 is connected to the driven means powering the track 5 through a differential drive means, and to the drive means 23 which powers the right set of wheels, through another differential drive means, the sprocket 21 and the chain 22. The drive means 23 is independently powered by the power plant of the All Terrain Vehicle and applies power directly to the wheel 1 and to the other wheel of the right set of wheels, the wheel 3.

Similarly, the power plant of the All Terrain Vehicle drives independently the drive means 24 which powers the wheel 2 and the other wheel of the left set, and which is connected to the sprocket 26 by the chain 25. The sprocket 26 is connected through a differential drive means to the driven means that powers the track 8 which, in turn, is connected to the driven means powering the track 7 through another differential drive means.

The track assembly of the All Terrain Vehicle comprises the tracks 4, 5, 6, 7 and 8, the frame 9, the idler wheels 15, 16, 17, 18 and 19 that shape the track 4, corresponding idler wheels that shape the tracks 5, 6, 7 and 8, the driven means 20 that powers the track 4, corresponding driven means that power the tracks 5, 6, 7 and 8, and the differential drive means interconnecting these driven means. The whole assembly is normally mounted so that the lower surfaces of the tracks are positioned somewhat higher than the lowest sections of the wheels. Therefore, the tracks do not normally engage the ground when the All Terrain Vehicle moves over hard surfaces. They will assist the vehicle in climbing any obstacle, however, that is placed between the two sets of wheels.

It is easy to design shock absorbers/springs in such a manner that they can be expaned or contracted by hydraulic or pneumatic controls. Adjustment of the length of the shock absorber/spring 14 shown in FIG. 1 will adjust the position of the frame 9 relative to the main body 10, and thereby adjust the ground clearance of the tracks.

If the All Terrain Vehicle is to be used on improved, hard surfaces for a prolonged period of time, the whole track assembly can be removed by detaching the brackets 11 and 12 at the front end, detaching the shock absorbers/springs at the aft end, and detaching the chains 22 and 25 from the sprockets 21 and 26.

An All Terrain Vehicle that does not have the feature of adjustable ground clearance of the track assemble, can still be designed to engage different terrains with different load bearing surfaces, by staggering the ground clearances of its tracks as shown in FIG. 3. The vehicle with staggered tracks as shown in this Figure, will move on its wheels only as long as it travels over hard surfaces. As the wheels sink into soft ground, first the tracks 27 and 31, then the tracks 28 and 30, and finally the track 29 will engage with the terrain, thereby progressively increasing the load bearing area of the vehicle's running gear, lowering the ground pressure exerted by its running gear, and increasing its off-road mobility and maneuverability on soft terrain.

The preceding description and the FIGS. 1, 2 and 3 show how an All Terrain Vehicle could be designed that has a good mobility over hard, improved surfaces as well as over soft, offroad terrain. The novel feature of this All terrain Vehicle is its powered running gear that comprises two sets of wheels mounted along the sides of the vehicle, as well as a multiplicity of tracks covering substantially the whole underside of the vehicle. Although specific embodiments of the invention have been illustrated and described, it is understood that various alterations in the details of the construction can be made without departing from the scope of the invention which is indicated in the appended claims.

References Cited in this Application
1. U.S. Pat. No. 1,749,276 issued on Mar. 4, 1930 to J. T. Edmonds for SHALLOW WATERBOAT.
2. U.S. Pat. No. 3,371,733 issued on Mar. 5, 1968 to Paul Kehler for FULLY TRACKED VEHICLE.

3. U.S. Pat. No. 3,456,750 issued on July, 22, 1969 to Paul Kehler for SELF - BURYING TRACKED VEHICLE.
4. U.S. Pat. No. 3,710,886 issued on Jan. 16, 1973 to Andrew F. Wagner for MECHANISM FOR CONVERTING WHEELED VEHICLE INTO TRACKED VEHICLE.
5. U.S. Pat. No. 3,724,580 issued on Apr. 3, 1973 to William J. Adams, Jr., for CONVERTIBLE TRACK SYSTEM FOR WHEELED VEHICLE.
6. U.S. Pat. No. 3,737,001 issued on June 5, 1973 to Rudolf Rasenberger for TRACK ASSEMBLY FOR CONVERTING WHEELED VEHICLES.
7. U.S. Pat. No. 3,774,706 issued to Elmer Carl Kiekhaefer for WHEEL KIT FOR SNOWMOBILIES.
8. U.S. Pat. application Ser. No. 420,285, dated Nov. 29, 1973, by Paul Kehler for WHEELED BELLYLESS VEHICLE.
9. Copending patent application by Paul Kehler for COAXIAL SET OF DIFFERENTIAL GEAR TRAINS, submitted simultaneoulsy with the present application and based on Disclosure Document No. 009,431.
10. Disclosure Document No. 009,431 filed by Paul Kehler on Mar. 6, 1972 for COAXIAL SET OF DIFFERENTIAL GEAR TRAINS.

I claim:
1. A vehicle comprising a main body, a set of wheels on each side of said main body, a track assembly mounted between the two sets of wheels and under said main body, with said track assembly comprising amultiplicity of powered tracks that cover substantially the whole underside of said vehicle and that do not extend as far down as the wheels of said two sets of wheels,
    said vehicle further comprising drive means for individually driving said two sets of wheels in the same or in opposite directions at the same or at different speeds, driven means for driving each of said powered tracks, and differential drive means for transmitting power from said sets of wheels to said driven means of said tracks for causing each track to move with a ground speed that is intermediate the ground speeds of its two adjacent tracks or intermediate the ground speeds of its adjacent track and its adjacent set of wheels.
2. A vehicle according to claim 1, in which the ground clearance of said tracks can be adjusted by lowering or raising the rear end of said track assembly by pivoting said track assembly around a shaft that is in fixed position relative to said main body.

* * * * *